US009692718B2

(12) United States Patent
Bennett

(10) Patent No.: US 9,692,718 B2
(45) Date of Patent: Jun. 27, 2017

(54) INMATE COMMUNICATION SYSTEM

(71) Applicant: World Emergency Network—Nevada Ltd., Carson City, NV (US)

(72) Inventor: Christopher Ryan Bennett, St. Petersburg, FL (US)

(73) Assignee: World Emergency Network—Nevada, Ltd., Carson City, NV (US)

( * ) Notice: Subject to any disclaimer, the term of this patent is extended or adjusted under 35 U.S.C. 154(b) by 30 days.

(21) Appl. No.: 14/609,969

(22) Filed: Jan. 30, 2015

(65) Prior Publication Data
US 2015/0215254 A1 Jul. 30, 2015

Related U.S. Application Data

(60) Provisional application No. 61/933,640, filed on Jan. 30, 2014.

(51) Int. Cl.
*H04L 12/58* (2006.01)
*H04M 3/22* (2006.01)

(52) U.S. Cl.
CPC .............. *H04L 51/12* (2013.01); *H04L 12/58* (2013.01); *H04M 3/2281* (2013.01); *H04L 51/28* (2013.01)

(58) Field of Classification Search
None
See application file for complete search history.

(56) References Cited

U.S. PATENT DOCUMENTS

| | | | | |
|---|---|---|---|---|
| 6,668,045 B1 * | 12/2003 | Mow | ................... | H04M 3/2281 379/67.1 |
| 7,278,028 B1 * | 10/2007 | Hingoranee | ............ | G06F 21/32 713/161 |
| 7,805,457 B1 * | 9/2010 | Viola | ..................... | G06Q 10/00 707/769 |
| 8,917,848 B2 * | 12/2014 | Torgersrud | .............. | H04M 3/38 379/142.05 |
| 9,020,115 B2 * | 4/2015 | Hangsleben | ........ | H04M 3/2218 379/188 |
| 9,106,789 B1 * | 8/2015 | Shipman, Jr. | .......... | H04N 7/147 |
| 9,113,131 B1 * | 8/2015 | Passe | ....................... | H04M 3/38 |
| 2006/0245559 A1 * | 11/2006 | Hodge | ................ | H04L 12/5835 379/88.19 |
| 2007/0003026 A1 * | 1/2007 | Hodge | .................. | H04M 3/533 379/88.1 |
| 2008/0043993 A1 * | 2/2008 | Johnson | ................. | H04M 11/04 379/386 |

(Continued)

*Primary Examiner* — Ninos Donabed
(74) *Attorney, Agent, or Firm* — Fenwick & West LLP

(57) ABSTRACT

An inmate communication system is configured to manage the sending and receiving of messages on a messaging service between an inmate incarcerated in a correctional institution and other inmates, or between the inmate and a contact located outside of the facility. Example messaging services include SMS and MMS. Inmates are provided access to a messaging terminal. The inmates interact with the messaging terminal to compose messages for transmission and view received message transmissions. The message communications of the inmates and contacts are analyzed prior to transmission to the recipient. Message contents are analyzed for flagged key-words and flagged sender/recipients. Flagged messages may be placed in an approval queue prior to their delivery for approval or rejection.

18 Claims, 6 Drawing Sheets

(56) References Cited

U.S. PATENT DOCUMENTS

| | | | | |
|---|---|---|---|---|
| 2009/0067587 A1* | 3/2009 | Rokosky | H04M 3/2281 | |
| | | | | 379/69 |
| 2010/0189228 A1* | 7/2010 | Seyfetdinov | H04M 3/42 | |
| | | | | 379/88.14 |
| 2012/0204029 A1* | 8/2012 | Trabucco | H04N 7/147 | |
| | | | | 713/168 |
| 2013/0179949 A1* | 7/2013 | Shapiro | H04L 51/12 | |
| | | | | 726/4 |
| 2013/0218770 A1* | 8/2013 | Prather | G06Q 20/40145 | |
| | | | | 705/44 |
| 2013/0226678 A1* | 8/2013 | Perna | H04L 51/04 | |
| | | | | 705/14.4 |
| 2014/0218466 A1* | 8/2014 | Bloms | H04N 7/152 | |
| | | | | 348/14.09 |
| 2014/0219432 A1* | 8/2014 | Bengston | H04M 3/38 | |
| | | | | 379/196 |
| 2014/0266686 A1* | 9/2014 | Torgersrud | G06Q 20/40 | |
| | | | | 340/521 |
| 2014/0267547 A1* | 9/2014 | Torgersrud | H04W 12/08 | |
| | | | | 348/14.02 |
| 2014/0273929 A1* | 9/2014 | Torgersrud | H04M 15/886 | |
| | | | | 455/406 |
| 2014/0279789 A1* | 9/2014 | Torgersrud | G06Q 10/10 | |
| | | | | 706/46 |
| 2014/0334610 A1* | 11/2014 | Hangsleben | H04M 3/2218 | |
| | | | | 379/32.01 |
| 2015/0207927 A1* | 7/2015 | Torgersrud | H04M 3/38 | |
| | | | | 379/88.02 |

* cited by examiner

INMATE COMMUNICATION SYSTEM

CROSS REFERENCE TO RELATED APPLICATIONS

This application claims the benefit of U.S. Provisional Application No. 61/933,640, filed Jan. 30, 2014, which is incorporated by reference herein in its entirety.

BACKGROUND

1. Field of Art

The present disclosure generally relates to the field of improving quality of life for inmates of a correctional institution and more specifically to supporting inmate communications via messages over a messaging service.

2. Background of the Invention

Jail phone systems have existed for some time and provide inmates of a correctional institution with the ability to make outbound calls to friends or relatives, usually for up to 15 minutes at a time. Jail phone systems enhance the quality of life for inmates and provide a source of revenue for the correctional institution and phone vendors. Inmates that wish to use the phone system are either charged a fee when the call is answered or incur a fee on the recipient to answer the call, which may be charged at a flat fee or per minute rate. The inmates' phone calls are recorded and oftentimes the communications of an inmate are monitored by the inmate's case-agent, making them a valuable intelligence-gathering source when criminal activities and actors in the criminal activities are openly discussed over the phone.

More recently, vendors have introduced systems that enable inmates to send and receive e-mail. These systems have time and cost components similar to phone calls placed through the jail phone system, but serve the specific function of e-mail communication.

While these systems improve the life of inmates, they ignore one of the most predominate methods of communication. Specifically, they do not support the sending and receipt of messages over a messaging service such as short message service and multimedia messaging service. Hence, a system supporting inmate communications via messages over a messaging service can further improve the quality of life for incarcerated individuals.

BRIEF DESCRIPTION OF THE DRAWINGS

The teachings of the embodiments can be readily understood by considering the following detailed description in conjunction with the accompanying drawings.

Figure (FIG.) 1A is a diagram illustrating an environment for implementing a messaging service for inmates to transmit messages to a contact according to one example embodiment.

DETAILED DESCRIPTION

Figure 1A:
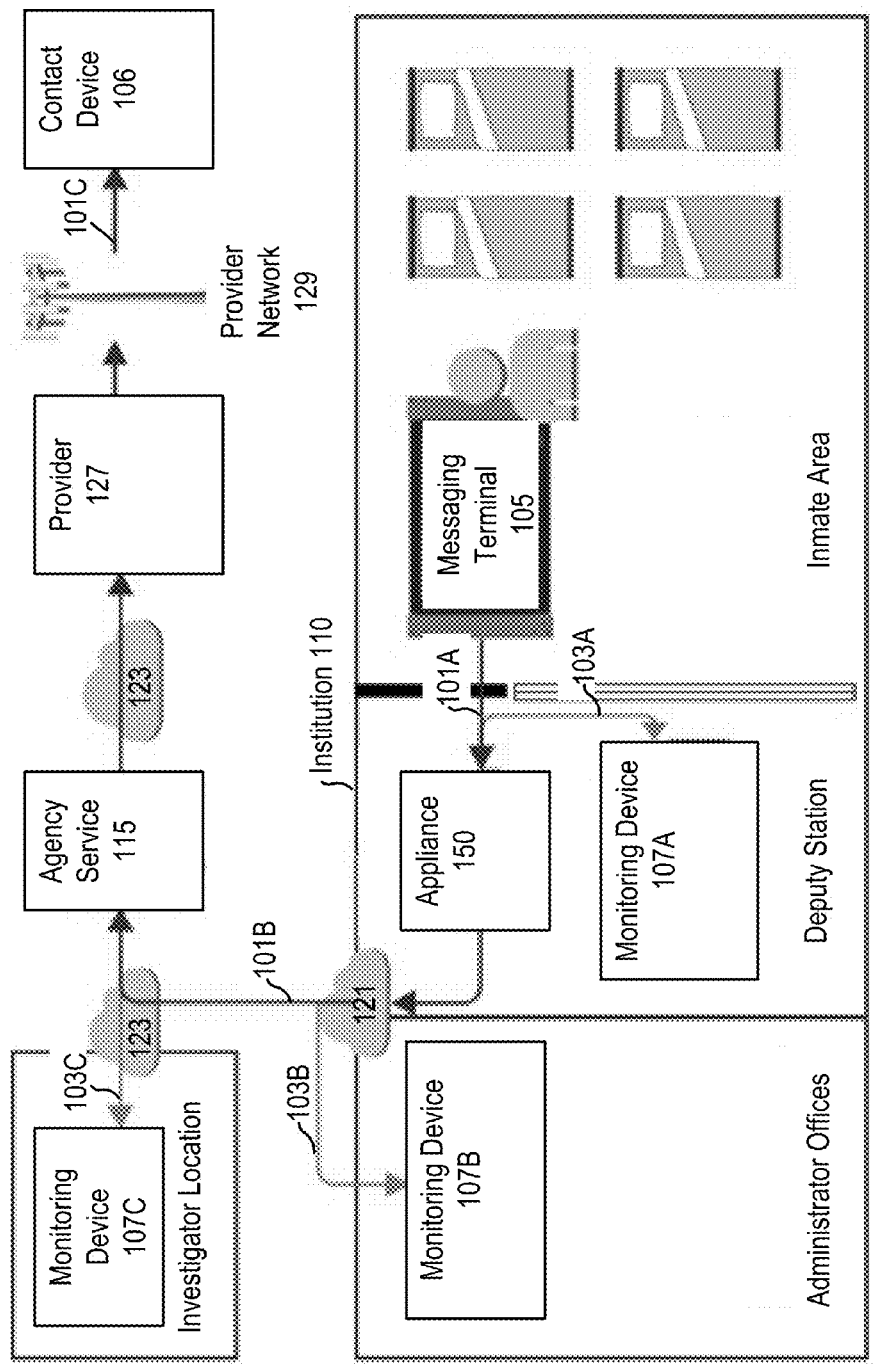
FIG. 1B is a diagram illustrating an environment for implementing a messaging service for inmates to receive messages from a contact according to one example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

Messages such as those on the Short Message Service (SMS) and Multimedia Messaging Service (MMS) are a predominant method of electronic communication, and their availability in correctional institutions would improve quality of life for inmates in addition to providing an opportunity for the correctional institution to generate addition revenue and gather useful intelligence for ongoing or future investigations.

An inmate communication system is configured to manage the sending and receiving of messages on a messaging service between an inmate incarcerated in a correctional institution and other inmates, or between the inmate and a contact located outside of the facility. Example messaging services include SMS and MMS. Other messaging technologies such as iMessage and Blackberry Messaging may also be supported in a similar fashion. Additionally, transcription services may be provided to facility the translation of audio communications to text for transmission in messages though the inmate messaging service.

In one embodiment, inmates are provided access to a messaging terminal. The inmates interact with the messaging terminal to compose messages for transmission and view received message transmissions. The messaging terminal may include modules executable on a variety of devices to provide the functionalities described herein. In one embodiment, the modules are configured for execution on a messaging terminal such as a tablet computer, examples of which include an Apple, Android, or Windows Tablet. Such devices are available at a relatively low cost and provide a range of communications capabilities, such as network connectivity through wired, wireless, or mobile internet from major mobile service providers. To prevent damage and theft, the device may be housed in a steel, tamper-proof enclosure, and located in an area the inmates frequent. Alternatively, the modules may be configured for execution on pre-existing computer hardware available to the inmates, such as an electronic system managing inmate activities and accounts located in an area the inmates frequent. Thus, for example, the messaging system may be integrated with other services, such as medical appointment scheduling, and an inmate's canteen (store) account for the ordering of provisions.

An inmate interacts with the messaging terminal to register with the messaging service and receives an inmate number for transmitting and receiving messages. In some embodiments, the inmate may port an existing number, such as the transmitting number of their mobile device, into the messaging service as their inmate number for transmitting and receiving messages. The messaging terminal may also request that the inmate agree to an informational notice providing consent to the tracking and monitoring their communications with contacts through the inmate number as indicated in the notification prior to being able to send/receive messages. For example, the inmate may consent to the tracking and monitoring of information such as time of message send/receipt, sender/recipient information, location of the contact, and/or message contents as indicated in the notification.

Once registered, the inmate may interact with the messaging terminal to compose a message to a contact, such as an individual outside of the correctional institution or another inmate registered with the messaging service, by entering a transmitting number for the contact. For example, the transmitting number for the contact may be the transmitting number of a mobile device of the individual outside the correctional institution or an inmate number assigned to the other inmate. In turn, the inmate may elect to send the message to the contact. Additionally, the inmate may interact with the messaging terminal to access messages received at their inmate number from the contact.

In some embodiment, the message terminal stores access control information for managing inmate use of the messaging terminal. For example, the access control information may authenticate an inmate to access their inmate number for composing messages and accessing received messages, set a permitted duration of one-time use, set a permitted duration of use over a time period such as a day, etc. In other embodiments, an appliance at the correctional institution may store the access control information which requested by the message terminal when an inmate attempts to use the message terminal. Thus, for example, multiple message terminals may be provided to inmates and managed uniformly through the appliance.

An agency service receives registration requests and provisions a virtual number with a provider for configuration as the inmate number. The inmate number is stored at the agency service. The inmate number may be stored along with information about the inmate such as the correctional institution where the inmate is incarcerated and thus, the address(es) (e.g., on a network) of the messaging terminal(s) through which the inmate can communicate using their inmate number. In embodiments where the correctional institution includes an appliance (e.g., for servicing one or more messaging terminals), the agency service may require only the address of the appliance. A case number may be assigned to the inmate based on the information about the inmate. In turn, message communications flowing through the inmate number may be stored according to the case number for subsequent review. In some embodiments, the case information may be maintained at an appliance at the correctional institution, which the agency service and authorized entities may access as needed during operation.

The agency service receives messages from the provider transmitted to the inmate number from contacts outside the correctional institution and messages from the messaging terminal to be transmitted from the inmate number. Thus, a contact outside the correctional institution may compose a message to the inmate from their device in a traditional fashion by entering the inmate number and sending the message to the inmate number.

Messages received at the agency service include the contents (e.g., text) of the message and sender/recipient message information indicating the inmate number and the transmitting number for the contact (which in some cases may be an inmate number of another inmate) and whether the inmate (or contact) is the intended recipient or sender of the message. In either instance, a message may be analyzed prior to delivery to the intended recipient and/or stored for subsequent review and analysis. For example, the agency service may analyze the message contents for flagged keywords. In another example, the agency service may analyze the sender/recipient message information for flagged inmate numbers and/or transmitting numbers for contacts. Flagged messages may be placed in an approval queue prior to their delivery or automatically not delivered depending on rules for flag. In turn, the agency service may receive an indication that a message placed in the approval queue was approved or rejected. If the message was approved, it is transmitted for delivery to the recipient. If the message was rejected it may be stored but not delivered to the recipient. A rejection notice may be transmitted for delivery to indicate to the sender that the message was rejected. To deliver the message to the recipient, the agency service may transmit instructions to a provider for transmitting the message (e.g., to an outside contact) on a message service according to the sender/recipient message information or transmits the message to the messaging terminal for inmate access. In some embodiments, an appliance at the correctional institution may perform the analysis. In such instances, the appliance may transmit approved outbound messages to the agency service, which are in turn transmitted to the recipient, and the agency service may pass inbound messages received at the inmate number to the appliance for analysis and approval at the correctional institution.

In some embodiments, the analysis of the message determines whether the message is a first message transmitted between the inmate and the contact based on the message information. In response to determining the message is a first message, the agency service and/or appliance may transmit notification information to the contact. The notification information may be transmitted prior to (e.g., as new message) or coincident with transmission of the first message and include an informational notice with instructions to confirm whether the contact would like to send/receive the message (or future message) to/from the inmate. In one embodiment, receipt of a confirmation from the contact serves to indicate that the contact consents to monitoring of their communications with the inmate. Consent of the contact may enable the agency service and/or other authorized party to track and monitor of information such as time of message send/receipt, sender/recipient information, location of the contact, and/or message contents as indicated in the notification. The informational notice may additionally provide instructions for the contact to rescind their consent at any time, in which case the transmitting number of the contact may be flagged as denying communications with the inmate.

In some embodiments, a monitoring device is permitted access to information about the message communications between inmates and contacts. The monitoring devices may access the information about the message communications via the agency service and/or an appliance managed by the correctional institution. For example, the monitoring device may access an approval queue for reviewing and approving or rejecting messages prior to transmission to recipients, logs of past messages sent/received by an inmate, logs of past messages sent/received by a contact to inmates, contents of the messages, sender/recipient information of the messages, flags for messages, and other determined information based on the message communications such as inmate-contact networks.

Example embodiments described herein relate to implementing an inmate messaging system over a wired (e.g., PSTN and the Internet) and wireless radio network (e.g., PSTN, Cellular Network, and/or WiFi) for network capable devices, such as a mobile phone, a land-line phone, VoIP phone, or computer, though a virtual number configured for inmate communications.

Messages between the inmate and their contacts may be recorded and all or a portion of collected message data distributed over existing channels (e.g., a network) between the agency service, appliance, monitoring devices of an investigator or prison personnel, or another entity. Embodiments of the agency service and/or other entities within the inmate messaging system such as an appliance managed by the correctional institution receive the collected messages for storage, analysis, and/or approval. Depending on the embodiment, monitoring devices are further configured to access and present (e.g., display) messages prior to transmission between an inmate and a contact for approval and/or subsequent review. For example, the monitoring devices may access a monitoring interface via the internet, API or execute a standalone monitoring module for approving a message, reviewing transmitted messages, and analysis of communications between inmates and contacts.

Environment and Implementation of the Inmate Messaging System

Figures (FIGS.) 1A and 1B are diagrams illustrating an environment 100 for implementing a messaging service according to one example embodiment. As shown the environment 100 includes a network 123 such as the internet connecting an agency support service provider "agency service" 115 to an institution 110 and a provider 127. In some embodiments, the institution 110 includes an internal network 121 coupled to the network 123. The internal network 121 may facilitate internal network communications between devices 105, 107, 150 within the institution that need not flow onto the network 123. The environment 100 further includes a provider network 129 facilitating wireless telephonic and data communications with contact devices subscribed to the provider 127. While only one agency service 115 and institution 110 are shown in FIG. 1A for clarity, embodiments of the agency service 115 can support many institutions 110.

Collectively, the networks 121, 123, 129 represent the communication pathways between the institution 110, agency service 115, the provider 127, contact device 106, appliance 150, messaging terminal 105, and monitoring devices 107. Embodiments of a given network 121, 123, 129 can include standard communications technologies and/or protocols and can include the Internet and PSTN. Oftentimes, these communications technologies and/or protocols carry both PSTN and Internet related data. Thus, a given network 121, 123, 129 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Similarly, the networking protocols used on a given network 121, 123, 129 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over a given network 121, 123, 129 can be represented using technologies and/or formats including analog audio (e.g., for last mile PSTN communications), messages on message service (e.g., SMS, MMS, iMessage, etc.), digital audio and video (e.g., as a file or streaming with Real Time Streaming Protocol), the hypertext markup language (HTML), the extensible markup language (XML), JavaScript, VBScript, FLASH, the portable document format (PDF), etc. In addition, all or some of the data exchanged over a given network 121, 123, 129 can be encrypted using conventional encryption technologies such as secure sockets layer (SSL), transport layer security (TLS), virtual private networks (VPNs), Internet Protocol security (IPsec), etc. In another embodiment, the entities on a given network 121, 123, 129 can use custom and/or dedicated data communications technologies instead of, or in addition to, the ones described above. For example, some government agencies (e.g., institution 110) and the military may operate networks (e.g., internal network 121) auxiliary to the internet and PSTN.

The provider 127 may include servers, switches and other hardware and software for communicating over the networks 123, 129 with communication service providers "CSPs" (not shown) and other entities. In one embodiment, the CSPs own telephone numbers for use on the PSTN and the CSPs own network (e.g., a wireless network that communicates with the PSTN). The provider 127 buys or leases numbers for use on the provider network 129 from multiple CSPs. The provider 127, in turn, manages numbers provisioned for use by the agency service 115 and the communications associated with the numbers. In one embodiment, the provider 127 allows the agency service 115 to provision one or more of the numbers as virtual numbers over the network 123.

Typically, a number used on the PSTN network directs to a given mobile device, VoIP device or land-line device having an associated number identity characterized by automatic number identification "ANI" information, or caller identification. Virtual numbers, while still operable with the PSTN, are associated with the provider 127 who handles the communications for the number. Because a virtual number does not direct to an end user device, the provider 127 may identify communications associated with the virtual number and transmit information about the communications and/or the communications themselves (e.g., messages on a message service received at a virtual number) to the agency service 115. Similarly, the provider 127 may receive instructions from the agency service 115 for completing communications though the virtual number, such as instructions for transmitting a message from the virtual number.

In addition to provisioning virtual numbers for the agency service 115, the provider 127 communicates notifications and data associated with the virtual numbers to the agency service 115 or other entity such as the institution 110. For example, the provider 127 may notify the agency service 115 (and optionally a monitoring device 107) when an inmate and/or contact communicate through a virtual number. The provider 127 may notify the agency service 115 of an incoming call or message to the virtual number and receive instructions from the agency service 115 for processing the communication. For example, the provider 127 may forward the message to the agency service 115. For incoming calls, the agency service 115 may instruct the provider 127 to direct the call to a voicemail of the virtual number where an informational notice (e.g., as a voicemail greeting informing the user the audio may be monitored) may be played and an option provided for the caller to request a transcription service to transcribe their voicemail audio recording into text (which implies consent to the informational notice as with the first message communications). In turn, the provider 127 can transmit the recordings and transcripts to the agency service 115 or other entity for processing. In the inmate messaging system, the agency service 115 may compose a message including the received transcribed audio as message content, fill in sender information corresponding to the transmitting number of the caller's device, and fill in recipient information corresponding to the virtual number. The agency service 115 may then process the message as any other message sent over a message service. In some embodiments, if the transcribed message corresponding to the voicemail is approved for delivery to the inmate, the audio recording may be supplied in association with the transcribed message.

In some embodiments, the provider 127 communicates directly with the monitoring terminal 105 and/or appliance 150 to provision virtual numbers, transmit notifications and data or receive instructions. Additionally, the provider 127 itself may function as a CSP and vice versa.

Agency service 115 represents a collection of compute devices (e.g., servers) and related storage mediums that are configured for performing various activities such as provisioning virtual numbers in response to inmate registration requests, configuration of the virtual numbers as inmate numbers to support inmate messaging, exchanging data over the network 123, and storing data in support of one or more institutions 110. Examples of exchanged data include message communications, analysis thereof, and other data transmitted between entities within the inmate messaging system. For example, the agency service 115 may include one or more modules providing ascribed functionality to an institution (and monitoring devices) via an application programming interface ("API") or web interface, as described in more detail with reference to FIG. 3.

The contact devices 106 are devices of contacts in communication with inmates of the institution 110 and are oftentimes mobile telephonic devices capable of receiving and transmitting (e.g., wirelessly) data such as messages on a message service over the provider network 129. Some examples of a contact device 106 include a mobile phone, tablet or notebook computer with access to the internet 123 and/or telephony provider network 129. As such, contact device 106 have an associated transmitting number such as an associated 10-digit telephone number or other identifier for transmitting and receiving messages on the message service. Example embodiments of the contact device 106 as a mobile phone include feature phones, smart phones or standard mobile phones. In some embodiments, other telephonic devices such as land-line phones are supported via voice-text transcription services with the inmate messaging system.

Institution 110 represents a collection of servers, desktop, notebook or tablet computers, mobile telephones and related storage mediums used by respective institution personnel and inmates for executing applications or modules to exchange data internally and/or with the agency service 115 and other entities. For example, the institution 110 may include a number of devices 105, 107, 150 within the inmate messaging system, which may be coupled through an internal network 121 of the institution 110 for exchanging data locally. Additionally, one or more of the devices, such as appliance 150 and/or messaging terminal 105, may be coupled through the internal network 121 of the institution to network 123 for communicating with the agency service 115. In some embodiments, the messaging terminal 105 and/or appliance 150 may communicate with the agency service 115 and other entities over a provider network 129 and/or the network 123. Institution 110 devices may execute a web browser to access a web interface or execute a mobile or desktop application for communicating with an API provided by the agency service 115.

As shown, the messaging terminal 105 is located in an inmate area for inmates to compose messages to contacts and access received messages from contacts through the inmate messaging system. For example, an inmate may register with the messaging terminal to receive an assigned inmate number and subsequently utilize the messaging terminal 105 to compose a message on the messaging terminal 105 for transmission to contact device 106 from their assigned inmate number, and utilize the messaging terminal to access a message received at their assigned inmate number from the contact device.

Some examples of a messaging terminal 105 include a tablet computer, kiosk computer, or other computing device with access to internal network 121, network 123, and/or telephony provider network 129. The messaging terminal 105 may include modules executable on a variety of devices to provide the functionalities described herein. In one embodiment, the modules are configured for execution on a messaging terminal 105 such as a tablet computer, examples of which include an Apple, Android, or Windows Tablet. Alternatively, the modules may be configured for execution on pre-existing computer hardware available to the inmates, such as an electronic system managing inmate activities and accounts located in an area the inmates frequent. Example modules of the messaging terminal 105 are described in greater detail with reference to FIG. 2.

In one embodiment, the institution 110 includes an appliance 150 for storing data about inmate communications through inmate numbers in the inmate messaging system. The appliance may utilize a monitoring interface provided by the agency service 115 for receiving and updating stored data and/or receive data directly from messaging terminals 105. Additionally, the appliance 150 may store messages transmitted and received through the inmate number. In some embodiments, rejected messages and draft messages are also stored. One example embodiment of the appliance 150 also includes its own interface (not shown) that enables monitoring devices 107 to access current and historic data stored on the appliance 150 as a result of inmate communications. Interfaces provided by the agency service 115 or appliance 150 may also be accessible via a web browser for streaming or downloading data and include the same or similar options. As such, in some embodiments, the appliance may include some or all of the functionality and/or modules ascribed herein to the agency service 115.

Additionally, the appliance 150 and agency service 115 may communicate to intermittently update collected data and records at defined intervals or in response to notifications to download data. During the intervals or notification periods, the agency service 115 may process the data and perform any necessary actions as required for analyzing messages and providing access to monitoring device 107 until the data is transferred to the appliance 150. In some embodiments, the agency service 115 maintains a persistent connection with the appliance 150 to facilitate transfer of data in real-time.

In one embodiment, the agency service 115 ensures that it, and the provider 127, do not store inmate communications beyond the time needed to facilitate transfer. However, in many situations, the institution 110 cannot rely on the availability of the appliance 150 for storing and maintaining collected data. Consequently, if the appliance 150 is unable to take possession of the collected data or goes offline during transfer, the agency service 115 and/or the provider 127 may maintain possession of the collected data until the appliance 150 is functioning. Furthermore, the agency service 115 and/or provider 127 may determine whether checksums, hashes or sizes of transferred data match the appliance's 150 version prior to deleting stored data.

In some embodiments, the agency service 115 maintains a database (not shown) storing hashes (e.g., MD5, SHA, etc.) that uniquely identify evidentiary files transmitted to the appliance 150. In the context of criminal investigations, the stored hash may serve to prove that recordings and other data on the appliance 150 have not been tampered with or compromised.

In some embodiments, the agency service 115 maintains an appliance instead of, or in addition to, the institution 110. In such cases, the appliance 150 may exist as a dedicated piece of hardware or remote storage. Alternatively, embodiments of the appliance 150 and/or agency service 115 may be implemented in a cloud computing and storage stack available on the network 123. Accordingly, the appliance 150 need not be located physically at the institution 110. In such cases, devices 105, 107A, 107B within the institution 110 may communicate with the appliance 150 and/or agency service 115 on the network 123 (e.g., via internal network 121) to perform their respective functions.

A number of monitoring devices 107 may connect to the agency service 115 and/or appliance 150 to obtain and present data associated with the message communications of inmates within the institution 110. Depending on the embodiment, a monitoring device is a network 123, 121 capable device that can be operated within an institution 110 (e.g., monitoring devices 107A, 107B) or externally in the field (e.g., monitoring device 107C). As referred to herein, a monitoring device is a mobile or stationary device capable of connectivity (e.g., wireless or wired) to a network such as an internal network 121 of the institution, the internet 132, PSTN and/or cellular network (e.g., provider network 129 providing internet 123 access).

A monitoring device 107 may provide a number of capabilities pertinent to the user's task. For example, a deputy station within the institution 110 may include a monitoring device 107A such as a desktop or notebook computer for an on-duty deputy to review pending messages 103A in an approval queue and approve or reject messages prior to their transmission to the contact device 106 or the messaging terminal. In another example, an administrator office may include a monitoring device 107B such as a desktop or notebook computer to review past messages 103B of an inmate when reviewing the inmate's file for parole or disciplinary purposes. In another example, an investigator may utilize a monitoring device 107C such as a tablet or mobile phone to review past messages 103C of an inmate or contact having communicated with an inmate the course of an investigation in the field. Additionally, monitoring devices (e.g., 107A, 107B within the institution 110) may configure access controls at the messaging terminal 105 to enable/disable access to the terminal for all inmates or specific inmates, set a permitted duration of one-time use, set a permitted duration of use over a time period such as a day, etc. Further, monitoring devices 107 may access results of message analysis performed at the agency service 115 and/or appliance 150.

Some examples of a monitoring device include a mobile phone, land-line phone, tablet and notebook or desktop computer. Example embodiments of the monitoring device 107 as a mobile phone can include feature phones, smart phones or standard mobile phones. Accordingly, a given mobile phone or other device operated as a monitoring device 107 does not necessarily include or support all of the functionality ascribed herein to the monitoring device or the inmate messaging system due to inherent differences in device capabilities. In one example embodiment, the monitoring device executes a monitoring module for interfacing with entities such as the appliance 150 over internal network 121 or the agency service 115 over network 123 to monitor inmate message communications and analysis of those communications.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes.

As used herein, the terms "message," "messaging," and "short messaging service (SMS) message" each comprise the breadth of messaging services and related technologies or standards used for communicating and transmitting data over the networks 121, 123. These technologies and services include SMS messages, multimedia messaging service "MMS" messages, proprietary messaging service messages such as BLACKBERRY messages "BBM" and the like.

Outbound Messages

Referring specifically now to FIG. 1A, FIG. 1A is a diagram illustrating an environment 100 for implementing a messaging service for inmates to transmit messages to a contact according to one example embodiment. The inmate accesses the messaging terminal 105 such as by providing authentication information verified with access control information. If the inmate is permitted access to the messaging terminal 105 to transmit messages from their inmate number, the inmate may compose a message and provide a transmitting number of the contact device 106 for receiving the message.

The messaging terminal 105 transmits the message 101A to the appliance 150. The message includes the contents of the message, the transmitting number of the content device 106 to receive the message, and the inmate number. The appliance 150 may transmit the message 101B to the agency service 115 for analysis or analyze the message itself. The analysis of the message indicates whether the message may be transmitted 101C to the contact device 106 or is flagged for further review.

If the message is flagged for review, the message is entered into an approval queue. A user of a monitoring device 107A may review a copy of the message 103A in the approval queue and either approve or reject the message. If the message is approved, the appliance 150 and/or agency service 115 receives a notification that the message should be transmitted 101 C to the contact device 106. If the message is rejected, the message is not transmitted 101C to the contact device 106, however the message may still be stored at the agency service 115 and/or appliance 150.

The agency service 115 instructs the provider 127 to transmit the message 101C to the contact device 106 with recipient information based on the provided transmitting number and sender information based on the inmate number.

In turn, the contact device 106 receives the message 101C which appears to have originated from the inmate number.

If the message is a first message transmitted between the contact device 106 and the inmate number, notification information may be transmitted to the contact device 106 with instructions for consenting to communicating with the inmate through the inmate messaging system.

Copies of the message 103B, 103C may also be reviewed at the monitoring devices 107B, 107C, respectively.

Inbound Messages

Figure 1B:
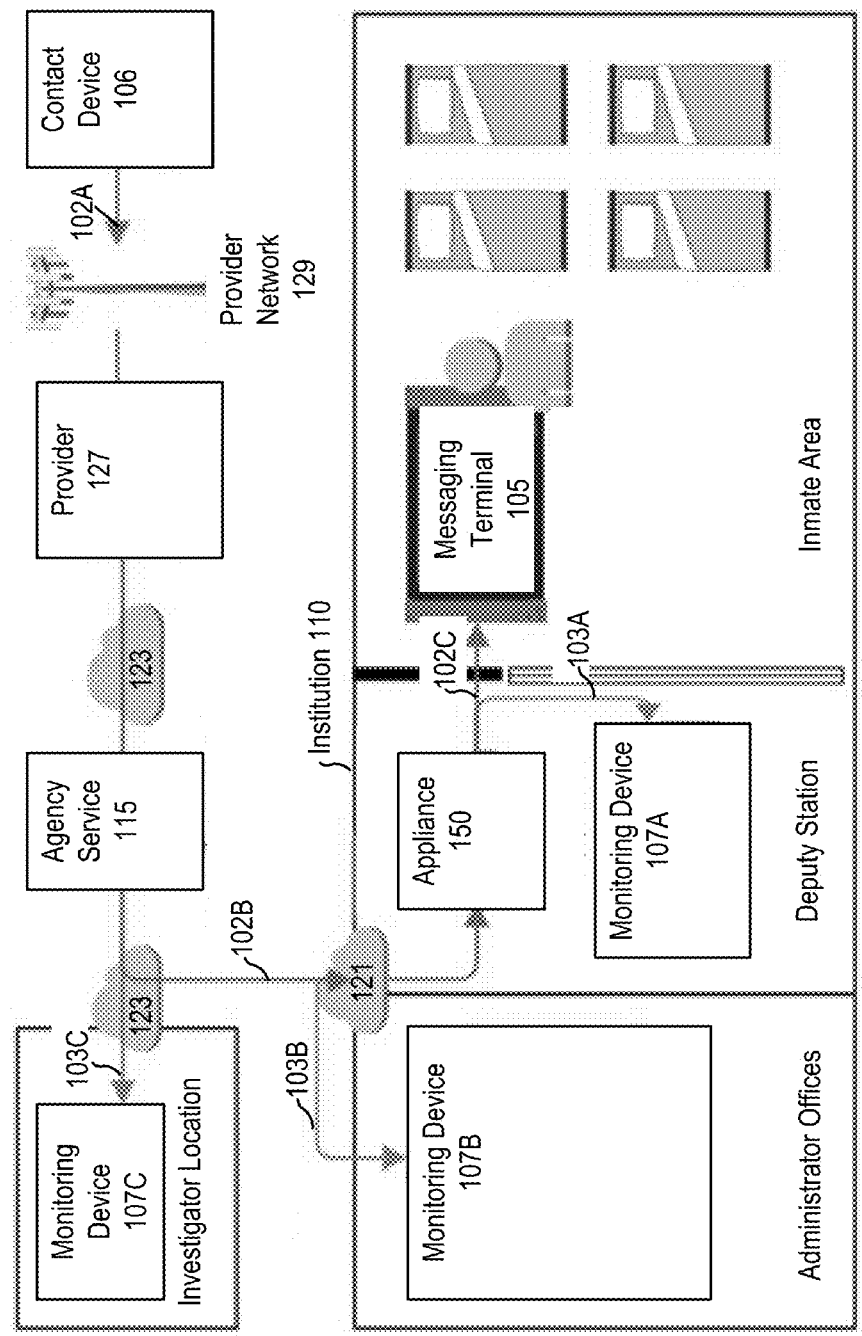

Referring specifically now to FIG. 1B, FIG. 1B is a diagram illustrating an environment 100 for implementing a messaging service for inmates to receive messages from a contact according to one example embodiment. The inmate accesses the messaging terminal 105 such as by providing authentication information verified with access control information. If the inmate is permitted access to the messaging terminal 105, the inmate may view approved messages on their inmate number transmitted by the contact device 106. The contact device 106 may receive the inmate number of the inmate by way of a previous message received from the inmate number, as described in FIG. 1A for example. The contact using the contact device 106 may also receive the inmate number by other means, such as lookup with the agency service 115 or institution 110, or directly from the inmate.

Knowing the inmate number, the contact utilizing the contact device 106 may compose a message and transmit the message 102A to the inmate number. The message includes the contents of the message, the transmitting number of the content device 106 having sent the message, and the inmate number to receive the message. In turn, the provider 127, through which the virtual number configured as the inmate number was provisioned with, receives the message and identifies the message recipient as a virtual number associated with the agency service 115 and transmits the message to the agency service 115.

The agency service 115 may transmit the message 102B to the appliance 150 for analysis or analyze the message itself. The analysis of the message indicates whether the received message may be transmitted 102C to the messaging terminal 105 accessed by the inmate or is flagged for further review. The agency service 115 may identify the appliance 150 to transmit messages received on an inmate number based on stored inmate information, such as the institution 110 where the inmate is incarcerated and an address (e.g., network address or the like) of the appliance 150 at the institution.

If the message is flagged for review, the message is entered into an approval queue. A user of a monitoring device 107A may review a copy of the message 103A in the approval queue and either approve or reject the message. If the message is approved, the appliance 150 and/or agency service 115 receives a notification that the message may be transmitted 102C to the messaging terminal 105 and accessible by the inmate. If the message is rejected, the message is not accessible to the inmate, however the message may still be stored at the agency service 115 and/or appliance 150.

If the message is a first message transmitted between the contact device 106 and the inmate number, notification information may be transmitted to the contact device 106 with instructions for consenting to communicating with the inmate through the inmate messaging system. In one embodiment, if the message is a first message, the notification information is transmitted to the contact device 106 prior to analysis of message content so as not to breach the privacy of the contact, and if the contact does not consent, the message is purged from the system.

Copies of the message 103B, 103C may also be reviewed at the monitoring devices 107B, 107C, respectively.

Messaging Terminal

Figure 2:
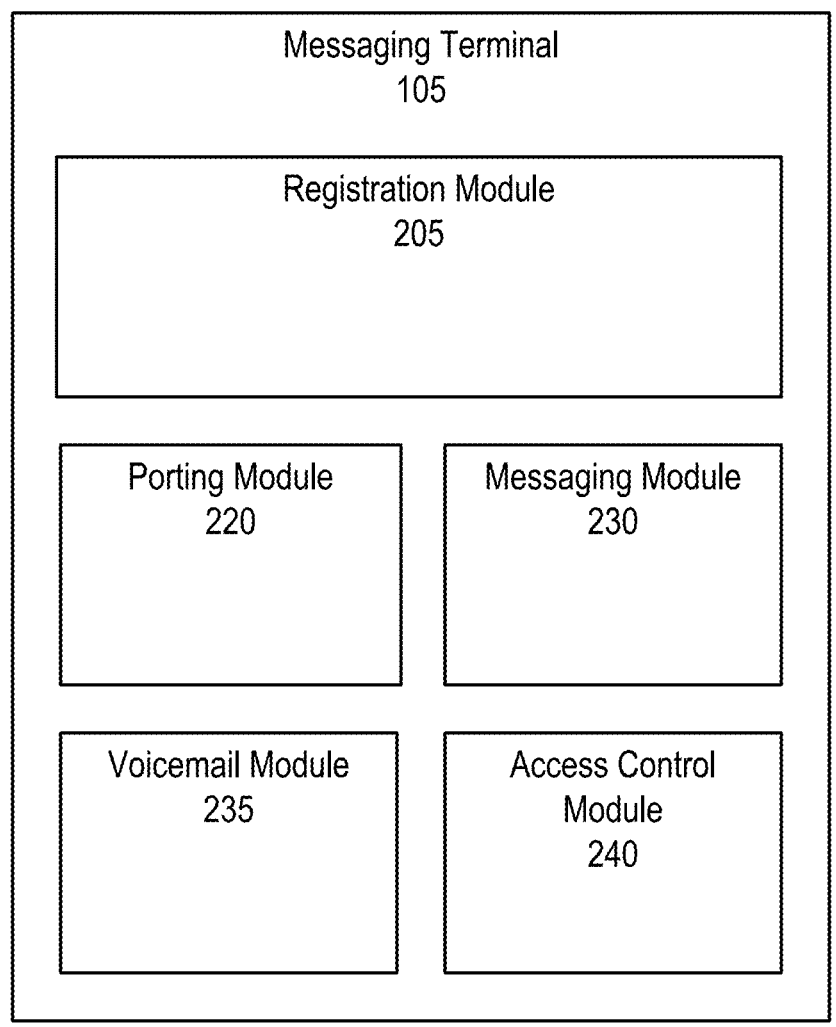
FIG. 2 is a block diagram illustrating components of a messaging terminal for inmate communications via messages over a messaging service according to one example embodiment.

FIG. 2 is a block diagram illustrating components of a messaging terminal 105 for inmate communications via messages over a messaging service according to one example embodiment. As shown, the messaging terminal 105 includes a variety of modules such a registration module 205, porting module 220, messaging module 230, voicemail module 235, and access control module 240 for facilitation inmate communications via messages over a messaging service. In addition to providing functionality for a stand-alone messaging terminal 105, the modules may be integrated in other devices inmates already have access to within the institution 110. Additionally, embodiments of the messaging terminal 105 need not include all the modules or their ascribe functionality herein. In some embodiments, the modules are provided to the messaging terminal 105 by the agency service 115 and/or appliance 150 when an administrator of the institution 110 desires to implement the service on the messaging terminal hardware 105.

The registration module 205 receives information about an inmate and requests an inmate number for the inmate. For example, if the inmate desires to use the inmate messaging system, the inmate may select an option to register with the system and provide identifying details about his or herself. The identifying details may be verified with information already known about the inmate to ensure the inmate attempting to register with the system is who he/she claims to be. For example, the registration module 205 may collect information from the inmate such as Inmate Booking Number, Inmate Photo, Date of Birth, and Gender and verifies the provided information with the known information about the inmate. In some embodiments, the provided information and inmate's registration request may be verified by institution personnel at a monitoring device. If the inmate is verified, the inmate is granted access to communication through the system. The registration module 205 may also request the inmate provide a security PIN such as a sequence of characters and/or numbers to secure their communications from other inmates.

For every inmate granted access to the system, the registration module 205 generates a request for an inmate number. The request for the inmate number may be serviced by a provider and/or agency service. The inmate number is a PSTN operable number unique to the inmate. In one embodiment, the inmate number is a virtual number. The request may include information about the inmate and/or the institution hardware such that communications flowing through the inmate number may be monitored and inbound messages directed to the appropriate institution hardware accessible by the inmate (e.g., the monitoring terminal 105 and/or appliance 150 servicing the monitoring terminal 105). The inmate number may be newly assigned or already belong to the inmate. For a new number, the registration module 205 receives confirmation of assignment of an inmate number to the inmate and displays the inmate number. For an existing number, such as that of a mobile device of the inmate that the inmate no longer has access to, the registration module 205 receives a confirmation indicating whether the existing number could be assigned to the inmate as an inmate number and displays the result to the inmate. In the case of failure to assign the existing number to the inmate, a new number may be assigned.

The porting module 220 provides an interface to service inmate requests to utilize an existing number. For example, in one embodiment, the inmate is given the option to port his/her existing personal phone number for use on the inmate messaging system. For example, at the time registration, the inmate may be presented with a digital number porting authorization form that instructs the CSP (such as AT&T or Verizon Wireless) who currently owns the existing number to lease the number as a virtual number, which may be configured for inmate use. When the CSP complies with the request—a process that could take hours or days—the inmate may be notified upon accessing the messaging terminal 105 that his/her existing number has been successfully configured as an inmate number available for sending/receiving communications.

When the inmate is released from the correctional institution, the inmate may opt to reclaim (port-out) their inmate number for use with their mobile device on the CSP. Similar to the port-in process, the inmate may complete an electronic form accessed via the interface of the porting module 220, but in this case the inmate number is released back to the CSP. In some embodiments, the inmate may be required to complete a hard-copy form to port in/out the number of their mobile device. In such cases, the porting module 220 may provide an interface for the inmate to request the form from institution personnel.

The messaging module 230 provides an interface for inmate to compose messages for transmission and view received message transmissions. Once registered and assigned an inmate number, the inmate is permitted access to the messaging module 230 to compose a message to a contact, such as an individual outside of the correctional institution or another inmate registered with the messaging service. For example, the interface of the messaging module 230 may include a "Compose New Message" icon or similar icon or label indicating that the inmate may begin a conversation with a contact. In turn, the inmate may enter message content via an on screen or external keyboard. In some embodiments, the messaging module 230 includes speech-to-text capability to enable an inmate to dictate the message contents.

The messaging module 230 may further present in the interface a recipient field for entering a transmitting number for the contact. The transmitting number for the contact may be the transmitting number of a mobile device of the individual outside the correctional institution or an inmate number assigned to the other inmate. Once the inmate has completed composing the contents of a message and entered the recipient transmitting number, the inmate may select a "Send Message" icon or similar to transmit the message to the contact through the interface. As the message may be analyzed and/or require approval, the messaging module 230 may receive updates indicating a message status (e.g., pending approval, sent, rejected, etc.) of the message and display the status in the interface in association with the message.

In one embodiment, the messaging module 230 displays recent sent messages and their status, along with received messages approved for the inmate to view. The interface may also include a contact field including the transmitting number of the contact a message was transmitted to or received from. The messaging module 230 may permit the inmate to manipulate the contact field to enter details for the contact, such as the first and last name of the content which is subsequently displayed in the interface. The messaging module 230 may provide the contact details entered by the inmate to the agency service 115 and/or appliance 150 for storage. In addition to providing a better experience for the inmate, the contact details are visible to monitoring devices 107, which may prove valuable in establishing the identity of an unknown contact during an investigation or policing inmate communications.

The messaging module 230 displays message received at the inmate number in the interface such that the inmate may view and respond to the received messages. For example, the inmate may select the message to view the message, tap a reply icon to compose a response, or similar to interact with received communications. The inmate may compose a response similar to the process discussed above, however the transmitting number of the contact may be carried over from the received message to the composed reply such that it need not be entered again by the inmate.

In some embodiments, the messaging terminal 105 includes a still image and/or video camera accessible to inmates for composing MMS messages through the interface of the messaging module 230. For example, if send and receipt of MMS messages is enabled at the message terminal 105 by institution personnel, inmates and contact may communicate through MMS messages containing image data. For example, a contact may send any image data in a traditional fashion and the messaging module 230 displays the image data within the interface when the inmate views the message. The messaging module 230 interface may include a "Take Picture" icon or label when composing a new message for collecting image data from the still image and/or video camera of the messaging terminal 105. Subsequent to taking the picture or video, the messaging module 230 may provide a previous of the image data which the inmate may choose to send or discard. In one embodiment, all MMS messages are flagged during message analysis for approval prior to transmission to the recipient.

The voicemail module 235 may be accessed by the inmate to listen to audio messages received on a voicemail of their inmate number. For example, the voicemail module 235 may display a play icon in association with information for the contact having recorded the voicemail. Selection of the play icon causes the voicemail module 235 to play the recorded message. Oftentimes, voicemails are transcribed and communicated as messages. In such instances, a transcribed message for the inmate to view may be shown in the interface presented by the voicemail module 235 in association with the play icon for the corresponding voicemail. In other embodiments, voicemail playback is disabled permanently, in which case voicemails may still be transcribed into messages and displayed within the messaging module 230 interface. If voicemail playback is only temporarily disabled, the play icon and transcribed message may be displayed as before in the voicemail module 235 interface but with the play icon inoperable.

In one embodiment, where the System is configured to refuse phone calls, when a Contact calls the Inmate Phone Number, the System instructs the Provider to play an automated message prior to disconnecting indicating that this number only accepts text messages. In another embodiment, the System sends the call to voicemail, where the Contact can record a voicemail. Voicemail may be retrieved in two ways. When the Inmate signs into the System, s/he will be displayed a machine-translated text copy of the voicemail message. Alternatively, or in addition to the text copy, a Play button may be displayed to enable audio playback of the voicemail. This feature may be disabled by the facility administrator if audio emitting from the tablet speakers is deemed a distraction to other inmates.

The access control module 240 stores access control information for managing registered inmate use of the messaging terminal. For example, once registered, an inmate may approach the messaging terminal 105 to enter his/her booking number, date of birth and security PIN in a log-in interface of the access control module 240 for authentication to access the messaging terminal 105. The access control module 240 verifies the supplied information with stored inmate information (e.g., that approved during registration). If the information provided by the inmate authenticates with that stored at the institution (e.g., on the appliance), the inmate is granted access.

In some embodiments, the access control module 240 stores access control information for managing the amount of time an inmate is permitted with the system. For example, the access control module 240 may receive limits specified by institution personal to set a permitted duration of one-time use, set a permitted duration of use over a time period such as a day, etc. In some embodiments, an appliance at the correctional institution may store the access control information which requested by the message terminal when an inmate attempts to use the message terminal. Thus, for example, multiple message terminals may be provided to inmates and managed uniformly through the appliance.

In some embodiments, the access control module 240 monitors inmate actions during the course of their use of the terminal to ensure only the authenticated inmate is composing and viewing communications. For example, one common problem in existing inmate phone systems involves one inmate authenticating with his booking number, and then handing the phone over to another inmate who makes the call. This makes it difficult to tie discussion of criminal activity to a specific individual. In instances where the messaging terminal includes image data collection capabilities, the access control module 240 may record image data at one or more stages in response to inmate activities at the messaging terminal 105. For example, the access control module 240 may collect image data at the inmate at sign in, log off, during composition of a message, and each time a message is sent and/or viewed. Additional images may also be captured at determined intervals. In one embodiment, the collection image data is stored in association with communication activities of the inmate's session. For example, the image data may be transmitted to the appliance and/or agency service for storage in association with messages that were sent/received temporally proximate to the collection of the image data. In turn, when a message or messages are reviewed at a monitoring device, the collected image data stored in association with the message or messages may also be provided to the monitoring device for display with the messages. Hence, an investigator or institution personnel can determine identities of those present with (or present instead of) an authenticated inmate during send/receipt/composition of a message. In some embodiments, the access control module 240 suppresses indications such as visual or audio cues that image data is being collected. Further, facial recognition logic may be incorporated at the appliance and/or agency service for analyzing the image data collected in association with a transmitted message in comparison to one or more images of the inmate for facial recognition to detect whether the authenticated inmate performed the actions.

In some embodiments, the access control module 240 interfaces with image collection devices, accelerometers, electric couplings, motion detectors, and/or other sensor devices to detect activities of inmates around and with the messaging terminal 105 to deter vandalism. Additionally, if a sensor reading exceeds a threshold (e.g., violent shaking causing abnormal accelerometer readings) and alarm may be triggered and all sensor devices activated to collect evidence for identifying the culprit (e.g., from image data). Video and images may be transmitted or streamed to an appliance and/or a monitoring device in the case of a triggered alarm and/or stored at the messaging terminal for later viewing. Upon activation of the alarm, the access control module 240 may suspend access to the terminal until later reinstated at a monitoring device or for a set time period.

Message Processing

Figure 3:
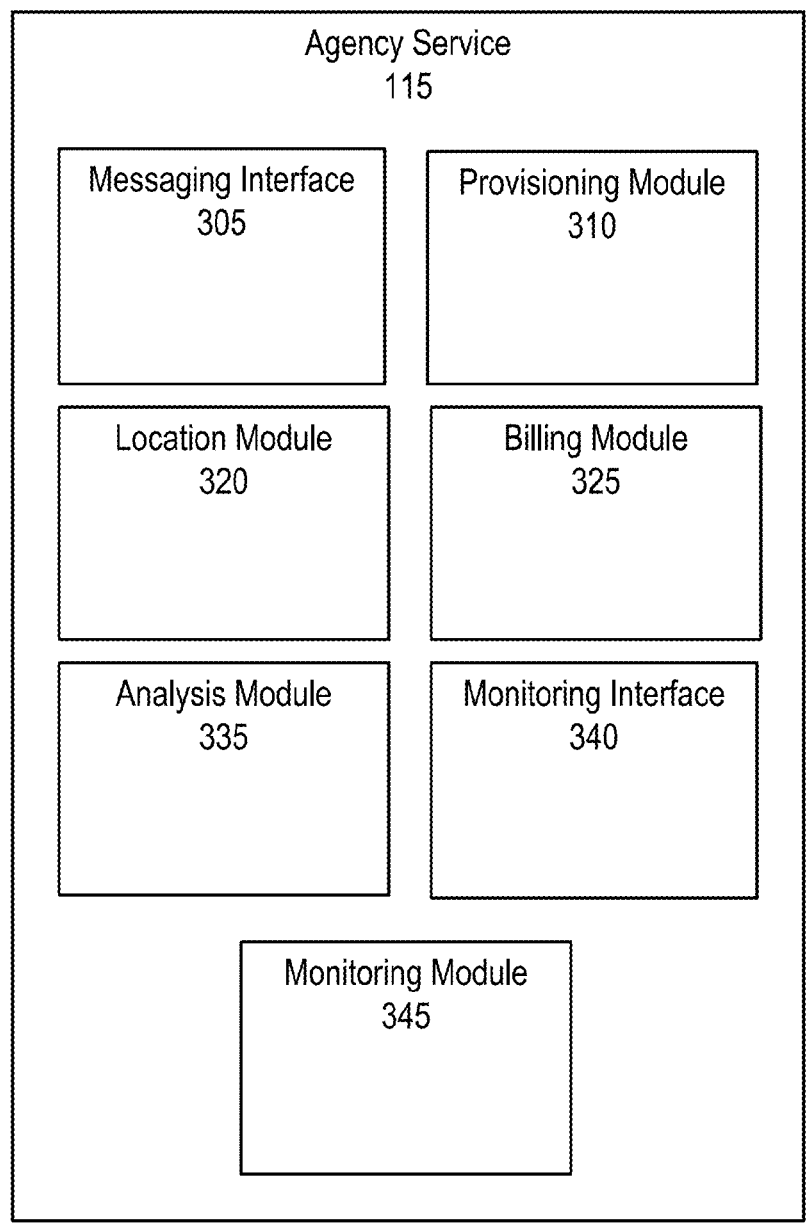
FIG. 3 is a block diagram illustrating components of an agency service supporting inmate communications via messages over a messaging service and monitoring of the communications according to one example embodiment.

FIG. 3 is a block diagram illustrating components of an agency service 115 supporting inmate communications via messages over a messaging service and monitoring of the communications according to one example embodiment. As shown, the agency service 115 includes a messaging interface 305, provisioning module 310, billing module 325, analysis module 335, monitoring module 340, and monitoring interface 345. Embodiments of an appliance 150 may include all or some of the modules/interfaces and ascribed functionality of the agency service 115.

The messaging interface 305 receives messages from the provider transmitted to the inmate number from contacts outside the correctional institution and messages from the institution (e.g., via the appliance and/or messaging terminal) to be transmitted from the inmate number.

Messages received at the messaging interfaces 305 include the contents (e.g., text) of the message and sender/recipient message information indicating the inmate number and the transmitting number for the contact (which in some cases may be an inmate number of another inmate) and whether the inmate (or contact) is the intended recipient or sender of the message.

For inbound messages to an inmate number, the messaging interface 305 may consult registration information stored in association with the inmate number to determine a location where the messages should be send for inmate receipt. For example, the registration information may indicate the address (e.g., network address, transmitting number, etc. of an appliance and/or messaging terminal) of a device through which the inmate can receive messages and thus where the messaging interface 305 should route and/or transmit messages and associated data received on the inmate number from contacts.

For outbound message to a contact device, the messaging interface 305 transmits the message with instructions to the provider 127 for sending the message from the inmate number to the contact device. For example, the messaging interface 305 may transmit instructions to the provider for transmitting the message (e.g., to an outside contact) on a message service according to the sender/recipient message information.

Prior to completing any outbound/inbound message delivery, the messaging interface 305 may pass the message or a copy of the message to the analysis module 335 for approval. In turn, the messaging interface 305 waits on approval of the message to complete the outbound/inbound message delivery.

The provisioning module 310 receives registration requests for provisioning and configuring virtual numbers for inmate numbers. A registration request for an inmate may include information such as an area code (e.g., 555) associated with the institution 110 where the inmate resides, country code (e.g., +44) and/or associated CSP for provisioning a virtual number. In some embodiments, the registration request is for an existing number and includes the existing number and lease information. In turn, the provisioning module 310 provisions a virtual number (either new or existing) with the provider and configures the virtual number as an inmate number for use on the messaging system. The provisioning module 310 may store information about the source (e.g., institution hardware information making the request and/or identity of the institution with associated message transmitting instructions) of the registration request in association with the inmate number for access by the messaging interface 305 to transmit messages between contacts and the inmate.

The provisioning module 310 transmits the results of the provisioning process to the institution for display to the inmate. For example, the messaging terminal 105 may display the new inmate number to the inmate or indicate success/failure of porting in the inmate's existing number. The provisioning module 310 may receive notifications about the status of provisioned numbers for their release, e.g., when an inmate ports out their existing number/no longer needs an inmate number when leaving the institution.

In some embodiments, the registration request includes information about the inmate requesting to register with the messaging service. The provisioning module 310 may open a case file for the inmate, such as by assigning a case number, for association with data collected for and determined about the communications of the inmate. In some embodiments, the provisioning module 310 identifies an existing case file in response to the inmate information, such as in instances where the inmate is reincarnated and requests a new inmate number (as the previous one was released). In this way, data may be stored around the inmate him/herself and not around inmate numbers which may change over time.

The location module 320 determines the location of contact devices having consented to participate in communications with an inmate through the messaging service. For example, as part of the intelligence-gathering operations, contacts may be required to share location information about their device in order to communicate with inmates. The location module 320 may store the current consent information provided by the contact and determine the location of the contact's device on communication attempts with the inmate. For example, the location module 320 may determine a location of the contact device through a location determining module or application transmitted to and executed on the contact device. Alternatively, the location module 320 may provide proof of content to a CSP associated with the contact device to obtain access to a CSP geolocation Application Programming Interface (API). The location module 320 may determine the location from the application and/or the API each time the contact sends a message to an inmate number, receives a message from an inmate number, and/or views a message from an inmate number while the consent of the contact is valid. The determined location of the contact device may be stored in association with action/message for which the location module 320 determined the location.

The billing module 325 tracks the number and type of messages communicated to/from an inmate. In some embodiments, the billing module 325 additionally tracks session duration by when an inmate logs in/out of a messaging terminal 105. Payment may be required for each message sent or received, each month of service, duration of terminal use, etc. The billing module 325 may store costs associated with each metric, such as SMS=0.10 c, MMS=0.25 c, 1 min=0.01 c, etc. Fees may be pre-paid or drafted from an institution bank account of the inmate, or paid by a contact (family member) via credit card, or other electronic funds transfer over the web, etc. The billing module 325 may flag an inmate number with the analysis module to halt the send/receipt of messages (even if approved) if an inmate account is not current. The billing module 325 may further transmit instructions to disable features for the inmate other than payment options.

In some embodiments, the billing module 325 calculates a revenue split between the agency service 115 and a given institution 110, and transfers revenues to the associated accounts and generates reports on revenue in real-time or monthly/annual basis.

The analysis module 335 analyzes messages to approve/deny transmission of a message and determines information about inmate-contact networks, trends in key-words, and other determined metrics from stored messages. Additionally, the analysis module 335 may store received messages according to inmate, such as by case number, and analytic results based thereon in a variety of desirable configurations (e.g., by contact). The analysis module 335 may also be queried to analyzes stored messages based on contact information, inmate information, key-words, etc.

In one embodiment, the analysis module 335 maintains a corpus of flagged key-words, transmitting numbers of contact devices, inmate numbers, and/or message type. The analysis module 335 analyzes a received message to determine whether the message includes flagged key words in the message contents and whether either the sender or recipient of the message is flagged. In one example, the analysis module may flag all MMS messages. Messages that are not flagged are approved for transmission by the message interface 305. The analysis module 335 may assign flagged messages to an approval queue reviewable at a monitoring device. In turn, the analysis module 335 receives an indication of whether a given message in the approval queue is approved or rejected. If a message is rejected, the analysis module 335 may instruct the message interface 305 to transmit a notification to the sender indicating that the message was rejected.

In some embodiments, the analysis module 335 determines whether a message is a first message transmitted between a given inmate and a given contact. In response to determining the message is a first message, the analysis module 335 instructs the message interface 305 to transmit notification information to the contact. The notification information may be transmitted prior to (e.g., as new message) or coincident with transmission of the first message and include an informational notice with instructions to confirm whether the contact would like to send/receive the message (or future message) to/from the inmate. In one embodiment, receipt of a confirmation from the contact serves to indicate that the contact consents to monitoring of their communications with the inmate. For subsequent analyzed messages between the inmate and contact, the analysis module 335 may interface with the location module 320 to request a location of the contact to track and monitor of information such as time of message send/receipt, sender/recipient information, location of the contact, and/or message contents as indicated in the notification. The analysis module 335 stores the messages and any additional information associated with message. For example, the analysis module 335 may receive image data from a message terminal collected proximate to inmate use of the terminal to transmit/compose/view messages and stored the image data in association with the message communications based on time stamps of the messages and image data.

In some embodiments, the analysis module 335 determines a relationship mapping between various inmates and contacts to visually represent the closeness of inmates and/or contacts and message contents. For example, the analysis module 335 may determine communications and relationships that would be of interest to investigators and institution personnel. For example, if inmate A and inmate B are thought to have no connection to each other, but both are communicating with a same contact, the relationship may be stored and displayed visually based on a linking (e.g., via a line) of the entities having communicated with each, e.g., a link between inmate A and the contact and another link between inmate B and the contact. In one embodiment, the relationship map is displayed in an interface whereby a user of monitoring device may select a link to display the communication history between the two individuals. Further, selecting an individual may display the communication history of that individual will all inmates/contacts or those currently displayed on the map. Further, the analysis module 335 may determine relationships between inmates and outside contacts based on message contents. For example, if the word "molly" appears in the contents of multiple messages, the individuals associated with those messages may be linked to the key word "molly" and additional links created for sender/recipient relationships of the individuals associated with the messages. In this manner, an investigator may utilize the system to analyze and navigate among potential code words utilized by a particular gang or group of individuals.

The monitoring interface 340 provides monitoring devices, such as those of a deputy, administrator, investigator, or other authorized party to approve/deny messages in an approval queue, request and view results analysis results, stored messages and associated information such as image and location data, and other determined information about inmate and/or contact communications through the inmate messaging system. The determined information (such as connections between inmates and outside parties) can provide investigators and institution personnel with evidence for prosecution, tips for safety risks, and other information useful to carrying out their duties. The monitoring interface 340 may be configured for access from the web (e.g., as a website) or as a standalone application or module such as a monitoring module 345 provided to mobile or desktop devices for accessing the monitoring interface to present information on a monitoring device. The features of the monitoring interface 340 of interest to investigators, deputies, etc., are discussed in greater detail below.

Deputies at institutions oversee inmates and may often be positioned in full view of both the inmates and the messaging terminal. The deputy may be required to assist inmates in registration or troubleshooting. In some embodiments, the monitoring interface 340 provides a monitoring device with control capabilities over the messaging terminal 105 for assisting remotely. Additionally, the monitoring device may manage the approval queue for nearby terminals. Additionally, the interface may deliver critical alerts (e.g., "an inmate in your assigned dorm at just typed the word escape" or similar).

The monitoring interface 340 may provide a monitoring device of administrators of institutions with control over modifying access controls at message terminals and access to the message system associated with their institution. For example, an administrator may utilize their monitoring device with the monitoring interface 340 to set access controls such as block/allow MMS, inmate session time parameters, etc.), view all communications of inmates registered with the system and analysis module access to search for specific inmate communications, etc.

In some embodiments, the agency service 115 includes a monitoring module 345 provided to monitoring devices for accessing the monitoring interface 340. Hence, the monitoring module 345 provides a means for monitoring devices to access the data. The monitoring module may include a log in for authenticating the user with the agency service 115 and to limit access based on user privileges. The monitoring module 340 may be provided to authorized monitoring devices 107 and executed on the monitoring device to present the same or similar information described with reference to the monitoring interface 340.

Computing Machine Architecture

Figure 4:
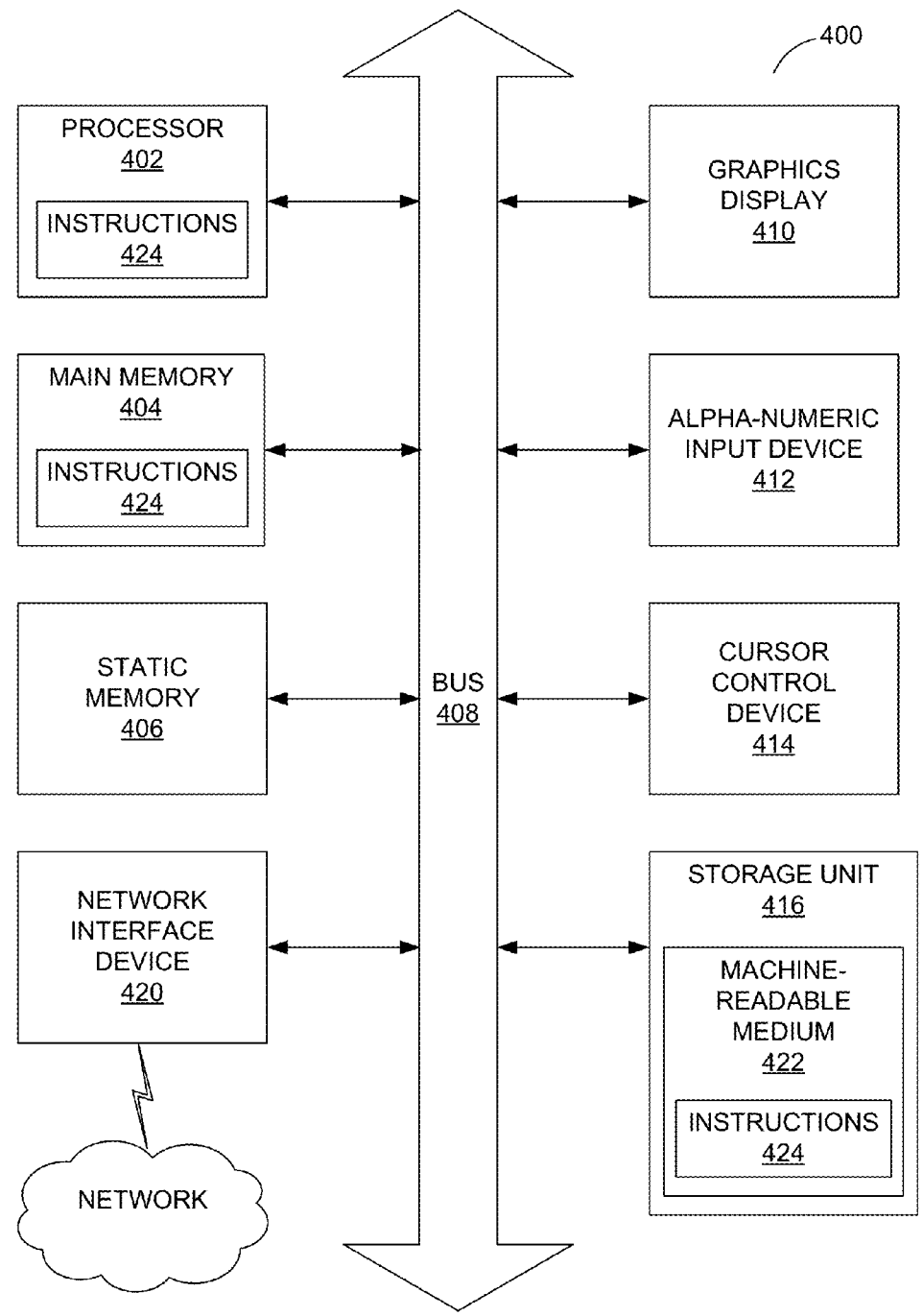
FIG. 4 is a block diagram illustrating components of computing systems for implementing a messaging service for inmates to transmit and receive messages according to one example embodiment.

FIG. 4 is a block diagram illustrating components of an example machine able to read instructions from a machine-readable medium and execute them in a processor (or controller) to implement the disclosed system for on-demand real-time network monitoring and subscriber identification. Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. It is noted that the computing system 400 configuration described in FIG. 4 can correspond with computing devices having functionality and performing operations ascribed to monitoring devices 107, agency service 115, appliance 150, contact device 106, provider 127, and messaging terminal 105 referenced in FIGS. 1A and 1B.

The machine may be a server computer, game system, television display, a client computer, a personal computer (PC), a tablet PC, a set-top box (STB) such as a DVR, a personal digital assistant (PDA), a cellular telephone, a smart phone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processors 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a storage unit 416, and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 202 also constituting machine-readable media. The instructions 424 (e.g., software) may be transmitted or received over a network such as networks 121, 123, and/or 129 via the network interface device 420. It is noted that the instructions 424 can correspond with the functional modules, e.g., 205, 220, 230, etc., and 305, 315, 320, etc., described in FIGS. 3 and 4, respectively.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Inmate Numbers

Figure 5:
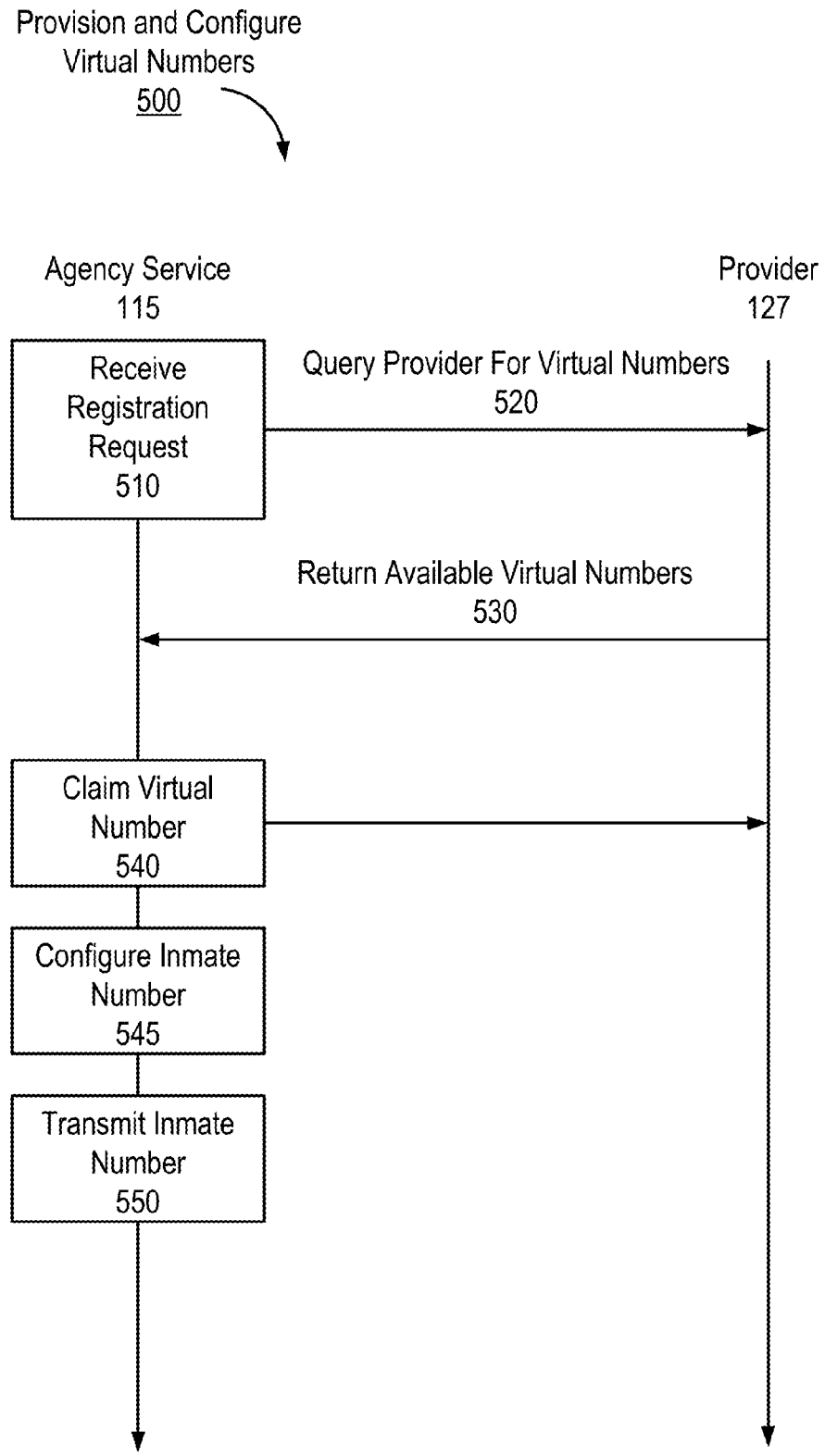
FIG. 5 is an interaction diagram illustrating a method for provisioning and configuring virtual numbers to enable inmates to transmit and receive messages according to one example embodiment.

FIG. 5 is an interaction diagram illustrating a method for provisioning and configuring virtual numbers 500 to enable inmates to transmit and receive messages according to one example embodiment. The agency service 115 receives registration requests 510 for provisioning and configuring numbers for inmate numbers 500 from one or more devices associated with a correctional institution. A registration request 510 for an inmate may include information such as an area code (e.g., 555) associated with the institution 110 where the inmate resides, country code (e.g., +44) and/or associated CSP.

In turn, the agency service 115 queries 520 the provider 127 for available virtual numbers matching the request. The provider 127 returns 530 available virtual numbers from which the agency service 115 claims 540 a virtual number for the inmate. In some embodiments, the agency service 115 queries 520 the provider 127 with an existing number of the inmate. In turn, the provider 127 may return 530 the existing number if it has been successfully leased to the agency service 115 (and thus is claimed) for use by the inmate as an inmate number on the messaging system.

The agency service 115 configures 545 the virtual number as in inmate number for use on the messaging service. For example, the agency service 115 may store information about the source (e.g., institution hardware information making the request and/or identity of the institution with associated message transmitting instructions) of the registration request 510 in association with the inmate number. The information about the source may indicate the address (e.g., network address, transmitting number, etc. of an appliance and/or messaging terminal) of a device through which the inmate can receive messages and thus where the agency service 115 should route and/or transmit messages and associated data received on the inmate number from contacts. In some embodiments, the agency service 115 may set up a voicemail on the inmate number including an informational notice and/or store an informational notice for first messages between a given contact and a given inmate.

When a virtual number is no longer needed by the agency 110, the agency service 115 releases the number back to the provider 127.

Additional Considerations

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

For example, the inmate messaging system described herein may be integrated with a booking system at the correctional institution. For example, registration with the system may be integrated with the correctional institution's existing booking software. During booking of an incoming inmate, inmate information is received in the booking system and provided to the messaging system as registration information. In turn, the messaging system receives the registration information from booking and automatically creates an account for inmates within the inmate messaging system. However, a virtual number may only be provisioned for the inmate when the inmate first accesses the messaging terminal. Alternatively, an employee of the facility may enter the inmate's registration information, either at the time of booking or thereafter using a monitoring device. The inmate may also self-register with the system in a similar fashion as previously described, but where the inmate enters his or her booking number and/or other personal details already known to the messaging system. Regardless of the method, the registration information collected may include but is not limited to Inmate Booking Number, Inmate Photo, Date of Birth, Gender, and Security PIN (which may be user selected).

In some embodiments, the messaging terminal is configured to access the provider network for sending/receiving messages, in which case the agency service also receives messages transmitted from the messaging terminal onto the provider network. For example, the agency service may store the transmitting number of the messaging terminal to identify received message from the messaging terminal as outbound messages. In turn, the messaging terminal transmits messages composed by an inmate to the inmate number of the inmate and appends the transmitting number of the contact device to the contents of the message. The agency service receives the messages from the provider as they are sent to the inmate number, and identifies the received messages as outbound messages by matching the sender information with the stored transmitting number of the messaging terminal. The agency service associates the inmate number with the transmitting number of the terminal such that replies from contacts may be directed to the correct terminal. To facilitate delivery of the message to the content, the agency service extracts the transmitting number of the contact device from the message contents and instructs the provider to send the message contents to the extracted transmitting number from the inmate number. As sender information for inbound messages received at the inmate number does not match that of the messaging terminal, the agency service identifies these messages as inbound to the inmate. In turn, the agency service appends the inmate number to the contents of the message and instructs the provider to transmit the modified message to the appropriate message terminal associated with the inmate number. In turn, the message terminal extracts the inmate number from the message to identify which inmate should receive the message.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method for establishing messaging communications between an inmate and a contact, the method comprising:
   receiving a request associated with an inmate for an inmate number, the inmate permitted access to a device of a correctional institution for engaging in the messaging communications;
   provisioning, in response to the request for the inmate number, a virtual number and configuring the virtual number as the inmate number for receiving and transmitting messaging communications associated with the inmate;
   analyzing, in response to receiving a message, recipient and sender information associated with the message to identify whether the message is a first message between the inmate and the contact, the sender and recipient information comprising the inmate number and a transmitting number associated with a device of the contact;
   transmitting, in response to identifying the message as a first message between the inmate and the contact, notification information to the device of the contact, the notification information providing instructions for the contact to consent to monitoring of messaging communications with the inmate;
   receiving an indication the contact consents to the monitoring of the messaging communications with the inmate;
   transmitting the message for delivery to one of the device of the contact and the device of the correctional institution based on the recipient and sender information associated with the message and the indication of the consent of the contact;
   receiving image data corresponding to activities of the inmate while accessing the device for engaging in the messaging communications; and
   generating a record of the activities of the inmate in a database by associating the image data with one or more messages viewed or composed by the inmate on the device.

2. The method of claim 1, further comprising:
   analyzing the message for flags prior to transmitting the message for delivery; and
   in response to the message being flagged, adding the message to an approval queue prior to transmitting the message for delivery.

3. The method of claim 2, wherein analyzing the message for flags comprises identifying if the recipient and sender information includes a flagged inmate number or a flagged transmitting number of a contact device.

4. The method of claim 2, wherein analyzing the message for flags comprises identifying if contents of the message contain a flagged key-word.

5. The method of claim 2, further comprising:
   providing an interface for a monitoring device to access the approval queue;
   receiving an indication of approval by the monitoring device for the message; and
   transmitting the message for delivery in response to the indication of approval.

6. The method of claim 1, further comprising determining, based on the indication of the consent of the contact, a location of the device of the contact.

7. A non-transitory computer-readable storage medium storing executable computer program instructions for establishing messaging communications between an inmate and a contact, the instructions when executed performing steps comprising:
   receiving a request associated with an inmate for an inmate number, the inmate permitted access to a device of a correctional institution for engaging in the messaging communications;
   provisioning, in response to the request for the inmate number, a virtual number and configuring the virtual number as the inmate number for receiving and transmitting messaging communications associated with the inmate;
   analyzing, in response to receiving a message, recipient and sender information associated with the message to identify whether the message is a first message between the inmate and the contact, the sender and recipient information comprising the inmate number and a transmitting number associated with a device of the contact;
   transmitting, in response to identifying the message as a first message between the inmate and the contact, notification information to the device of the contact, the notification information providing instructions for the contact to consent to monitoring of messaging communications with the inmate;

receiving an indication the contact contents to the monitoring of the messaging communications with the inmate;

transmitting the message for delivery to one of the device of the contact and the device of the correctional institution based on the recipient and sender information associated with the message and the indication of the consent of the contact;

receiving image data corresponding to activities of the inmate while accessing the device for engaging in the messaging communications; and generating a record of the activities of the inmate in a database by associating the image data with one or more messages viewed or composed by the inmate on the device.

8. The non-transitory computer readable storage medium of claim 7, further comprising instructions for:

analyzing the message for flags prior to transmitting the message for delivery; and in response to the message being flagged, adding the message to an approval queue prior to transmitting the message for delivery.

9. The non-transitory computer readable storage medium of claim 8, wherein analyzing the message for flags comprises identifying if the recipient and sender information includes a flagged inmate number or a flagged transmitting number of a contact device.

10. The non-transitory computer readable storage medium of claim 8, wherein analyzing the message for flags comprises identifying if contents of the message contain a flagged key-word.

11. The non-transitory computer readable storage medium of claim 8, further comprising instructions for:

providing an interface for a monitoring device to access the approval queue;

receiving an indication of approval by the monitoring device for the message; and transmitting the message for delivery in response to the indication of approval.

12. The non-transitory computer readable storage medium of claim 7, further comprising instructions for determining, based on the indication of the consent of the contact, a location of the device of the contact.

13. A system for establishing messaging communications between an inmate and a contact, the system comprising:

a server comprising a processor and a computer-readable storage medium storing executable computer program instructions, the processor executing the instructions to:

receive a request associated with an inmate for an inmate number, the inmate permitted access to a device of a correctional institution for engaging in the messaging communications;

provisioning, in response to the request for the inmate number, a virtual number and configuring the virtual number as the inmate number for receiving and transmitting messaging communications associated with the inmate;

analyze, in response to receiving a message, recipient and sender information associated with the message to identify whether the message is a first message between the inmate and the contact, the sender and recipient information comprising the inmate number and a transmitting number associated with a device of the contact;

transmit, in response to identifying the message as a first message between the inmate and the contact, notification information to the device of the contact, the notification information providing instructions for the contact to consent to monitoring of messaging communications with the inmate;

receive an indication the contact contents to the monitoring of the messaging communications with the inmate;

transmit the message for delivery to one of the device of the contact and the device of the correctional institution based on the recipient and sender information associated with the message and the indication of the consent of the contact;

receive image data corresponding to activities of the inmate while accessing the device for engaging in the messaging communications; and generate a record of the activities of the inmate in a database by associating the image data with one or more messages viewed or composed by the inmate on the device.

14. The system of claim 13, the server further comprising instructions to:

analyze the message for flags prior to transmitting the message for delivery; and in response to the message being flagged, add the message to an approval queue prior to transmitting the message for delivery.

15. The system of claim 14, wherein analyzing the message for flags comprises identifying if the recipient and sender information includes a flagged inmate number or a flagged transmitting number of a contact device.

16. The system of claim 14, wherein analyzing the message for flags comprises identifying if contents of the message contain a flagged key-word.

17. The system of claim 14, the server further comprising instructions to:

provide an interface for a monitoring device to access the approval queue;

receive an indication of approval by the monitoring device for the message; and transmit the message for delivery in response to the indication of approval.

18. The system of claim 13, the server further comprising instructions to determine, based on the indication of the consent of the contact, a location of the device of the contact.

* * * * *

UNITED STATES PATENT AND TRADEMARK OFFICE
CERTIFICATE OF CORRECTION

| | | |
|---|---|---|
| PATENT NO. | : 9,692,718 B2 | Page 1 of 1 |
| APPLICATION NO. | : 14/609969 | |
| DATED | : June 27, 2017 | |
| INVENTOR(S) | : Bennett | |

It is certified that error appears in the above-identified patent and that said Letters Patent is hereby corrected as shown below:

In the Claims

Column no: 25, Line(s) no: 1-3, Claim: 7, "receiving an indication the contact contents to the monitoring of the messaging communications with the inmate" to read as -- receiving an indication that the contact consents to the monitoring of the messaging communications with the inmate --

Column no: 26, Line(s) no: 15-17, Claim: 13, "receive an indication the contact contents to the monitoring of the messaging communications with the inmate" to read as -- receive an indication that the contact consents to the monitoring of the messaging communications with the inmate --

Signed and Sealed this
Twenty-fifth Day of September, 2018

Andrei Iancu
*Director of the United States Patent and Trademark Office*